(12) United States Patent
Rosini et al.

(10) Patent No.: US 12,108,758 B2
(45) Date of Patent: Oct. 8, 2024

(54) LOW VISCOSITY AGRICULTURAL ADJUVANT FOR SPRAYING SYRUPS AND METHOD OF PRODUCTION

(71) Applicant: FORQUIMICA AGROCIENCIA LTDA, Cambira (BR)

(72) Inventors: Edson Geraldo Rosini, Cambira (BR); Paulo Assis Dos Passos, Maringa (BR)

(73) Assignee: FORQUIMICA AGROCIENCIA LTDA (BR)

( * ) Notice: Subject to any disclaimer, the term of this patent is extended or adjusted under 35 U.S.C. 154(b) by 0 days.

(21) Appl. No.: 17/935,065

(22) Filed: Sep. 23, 2022

(65) Prior Publication Data

US 2023/0329232 A1    Oct. 19, 2023

(30) Foreign Application Priority Data

Apr. 14, 2022  (BR) .......................... 1020220073015

(51) Int. Cl.
*A01N 25/04* (2006.01)
*A01N 25/30* (2006.01)
*A01P 13/00* (2006.01)

(52) U.S. Cl.
CPC ............. *A01N 25/04* (2013.01); *A01N 25/30* (2013.01); *A01P 13/00* (2021.08)

(58) Field of Classification Search
CPC .......... A01N 25/04; A01N 25/30; A01P 13/00
See application file for complete search history.

(56) References Cited

FOREIGN PATENT DOCUMENTS

| AU | 2017386649 | * | 11/2019 | ............. A01N 25/06 |
|----|------------|---|---------|-------------------------|
| BR | 112018005502-6 | | 5/2017 | |
| BR | 112021013322-4 | | 7/2020 | |
| BR | 102019004266-4 | | 10/2020 | |

* cited by examiner

*Primary Examiner* — Zohreh A Fay

(74) *Attorney, Agent, or Firm* — La Morte & Associates P.C.

(57) ABSTRACT

A low viscosity agricultural adjuvant for spraying syrup comprising emulsifying agents, surfactants, suspending agents, defoamer, clays and water. This invention is directed to the agricultural sector and it is an adjuvant that can be classified as an activator and modifier of spraying and other modifiers. The adjuvant when added to the agricultural spray syrup, assists in the compatibility of phytosanitary products used for the formation thereof. This invention avoids the formation of possible organic and inorganic scale, which can affect the spraying equipment. The invention confers high syrup conditioning capacity and provides a homogeneous and fluid syrup preparation, with high efficiency from the outlet of the spray nozzle to the deposition of droplets in the crops.

5 Claims, 8 Drawing Sheets

LOW VISCOSITY AGRICULTURAL ADJUVANT FOR SPRAYING SYRUPS AND METHOD OF PRODUCTION

FIELD OF THE INVENTION

The present invention is directed to the agricultural sector and is an adjuvant that, according to its functions in relation to its effectiveness, can be classified as an activator and modifier of spraying and other modifiers.

The adjuvant when added to agricultural spraying syrups, assists in the compatibility of the phytosanitary products used for the formation thereof. In a syrup preparation, several phytosanitary products are used where the result of this mixture can lead to a mismatch between the chemicals that were used. The invention avoids the formation of possible organic and inorganic scale, which can affect the spraying equipment, with this, the farmer is able to optimize their time and the effectiveness of their application.

One of the important functions of this invention is the significant improvement in relation to the wettability, spreadability, and penetrability of agricultural pesticides, acting as defoamer, syrup conditioner, and drift reducer.

BACKGROUND OF THE INVENTION AND PRIOR ART

Adjuvant is defined as any substance present in a formulation or added to the spray tank to change the biological activity or characteristics of the application. They are an important class of chemicals and are used to improve the biological functions and activities of phytosanitary products.

They can be classified into two categories: activators and spray modifiers and other modifiers. Classification of spray activators and modifiers is intended to improve the biological performance and/or physical and chemical characteristics of the syrup. The types found for this classification are: surfactants, oils, adhesives, and spreaders, whose respective functions are: reduce surface tension, improve absorption, form film, adhere and resist rain washing. The classification of other modifiers offers the following types of adjuvants: buffering agents, defoamers, compatibilizing agents, and drift control agents, followed by the following functions respectively: improve solubility, reduce foaming, improve foaming, increase droplet size.

Currently, there are several types of adjuvants on the market, however, there are not many options for adjuvants that work as compatibilizers in the mixture of syrup. In addition, the lack of research on the physical and chemical incompatibility of phytosanitary products is notorious and there are few studies aimed at treating the problem, and the consequences of this physical incompatibility can lead to low quality and insufficient foliage coverage as a final result of spraying. The main types of physical incompatibility are: flocculation, viscosity modification, and the formation of lumps and fouling, in addition to resulting in damage to the spraying equipment such as: tank deposit, product stratification in the tank referring to the difference in density and nozzle clogging of the sprayer. Complaints from technicians and producers that the treatments do not present the expected result on the target organism in the crop are very common and, most of the time, this problem is related to a factor in the mixture of products in the spray syrup.

Referring to the prior art there are documents BR 102019004266-4, BR 112021013322-4 and BR 112018005502-6 which claim a composition containing adjuvant system and film-forming agents for fungicide spray syrup and method for treating a plant, liquid agricultural adjuvant and method of diluting a liquid agricultural adjuvant and an emulsifiable adjuvant, and method for manufacturing a buffered adjuvant composition with emulsified stable pH.

Document number BR 102019004266-4 describes an adjuvant comprised of derivatives of alkylpolyglycoside surfactants commonly called APGs, in combination with a polyvinylpyrrolidone-based dispersant/film former, as well as the use of this agricultural adjuvant composition to increase the physical stability of spray syrups, the anti-drift power of spray syrups and agronomic efficacy of contact fungicidal formulations, among them Mancozeb, Chlorothalonil, and cupric fungicides (Bordeaux or copper oxy sulfate, copper hydroxide, copper oxychloride, and cuprous oxide).

Document number BR 112021013322-4 requires a liquid agricultural adjuvant formed by an alkyl ester (C1C8) of an alkyl acid (C12C16), an anionic surfactant, and a nonionic surfactant. The liquid agricultural adjuvant has a flash point of greater than about 100° C. and an alkyl ester (C1C8) of an alkyl acid (C12C16) having a paraffinic wax dissolution capacity of between 2% w/w to 20% w/w to 25° C.

Finally, document number BR 112018005502-6 claims a stable self-emulsifying alkylated oil-based adjuvant with pH buffer capabilities, a method of preparing an adjuvant and using an adjuvant with industrial, turf, ornamental, horticultural, and agricultural applications.

In accordance with their specifications, all the above-mentioned documents describe and claim adjuvant products and compositions for improving pesticidal activity. However, the compounds, percentages, and mainly the process of obtaining the products do not read on this invention, which manages to solve the problems related to incompatibility at the time of mixing the adjuvant together with the syrup in the agricultural implementation tank, adding quality and better efficiency in the application of phytosanitary products. This is thanks to the mixture between components of the formulation, which were studied and calculated in quantities, where chemically and agronomically presented different results in relation to the other products on the market, especially about the mixture compatibility of phytosanitary products.

In short, the present invention brings the differential in relation to its effectiveness in syrup conditioning, compared to the others found in the market, since there are in its formulation agents that modify the syrup rheology, even if there is a need for the syrup to remain in the tank overnight. The invention also avoids agglutination between the syrup components, thus facilitating the homogenization of the tank, in addition to having the great advantage of not increasing the syrup viscosity, an important factor for the excellence of spraying.

BRIEF DESCRIPTION OF THE DRAWINGS

The present invention will be described below in greater detail, by way of non-limiting example, with reference to its preferred embodiment illustrated in the drawings below, in which.

DETAILED DESCRIPTION OF THE INVENTION

The formulation of the adjuvant integrates clay base in composition that act as adsorption agents of molecules contained in the syrup, with the purpose of improving the interaction of these molecules in the spray syrup. The technology used in this invention allows the presence of clay without the need for a considerable increase in the formulation. Thus, an ideal syrup is obtained so that the application is carried out without encrustation/clogging of the equipment nozzle.

Figure 1:
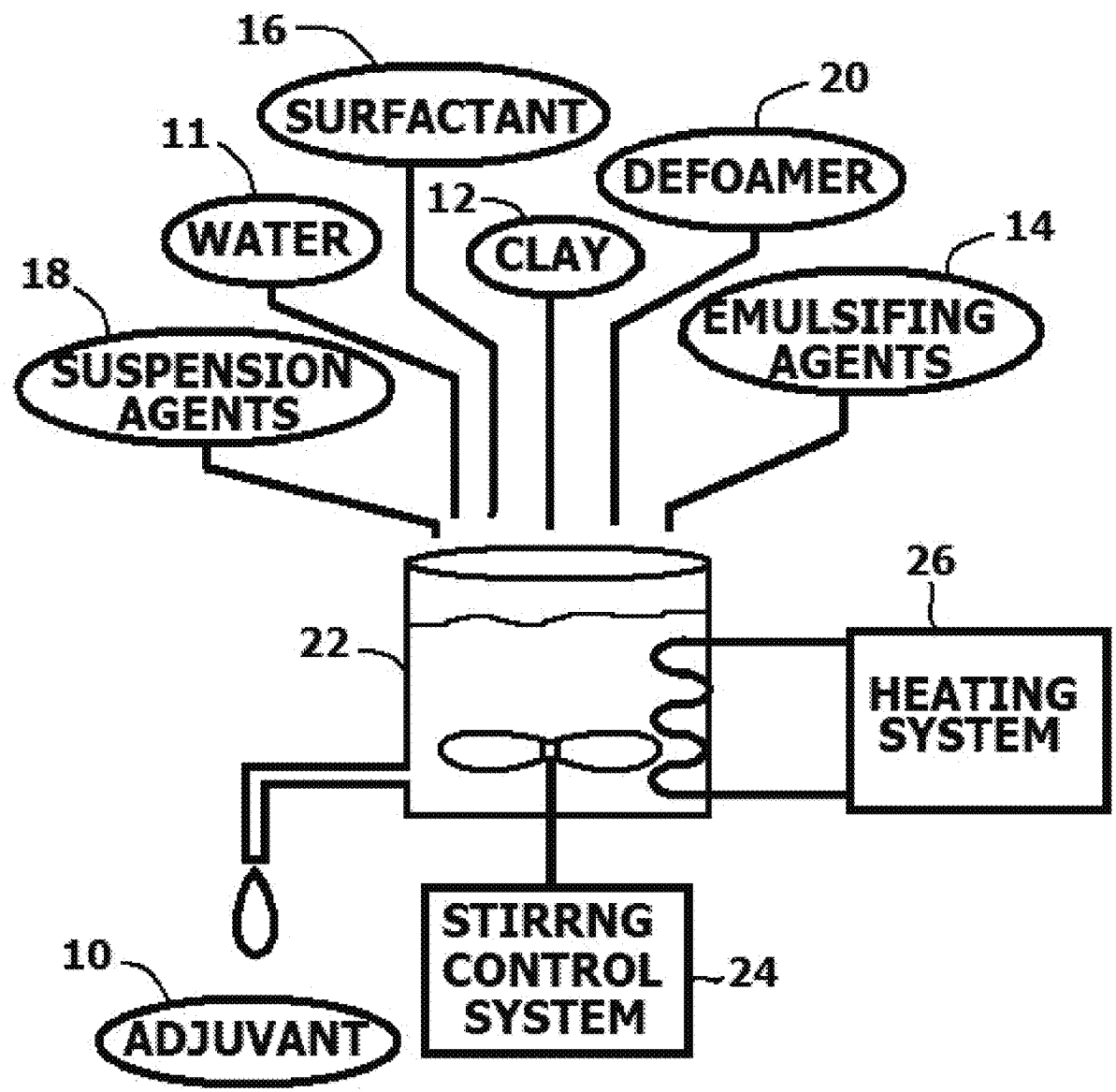
FIG. 1 shows a schematic of an exemplary embodiment of the present invention system and method.

Referring to FIG. 1, it will be understood that a low viscosity adjuvant 10 is obtained by the selective combination of water 11, clay 12, emulsifying agents 14, surfactants 16, suspending agents 18, and a defoamer 20.

The compounds used in the formulation with characteristics of emulsifying agents 14 and surfactants 16 are ammonium lauryl ether sulfate, sodium lauryl ether sulfate, triethanolamine lauryl ether sulfate, sodium lauryl ether sulfosuccinate, ammonium lauryl sulfate, sodium lauryl sulfate, ethoxylated alcohols, ethoxylated and propoxylated alcohols, ethoxylated fatty alcohols, ethoxylated cetostearyl alcohol, ethoxylated stearyl alcohol, ethoxylated isotridecyl alcohol, ethoxylated and phosphate isotridecyl alcohol, ethoxylated and sulphated isotridecyl alcohol, ethoxylated lauryl alcohol, ethoxylated oil, linear alkylbenzene sulfonic acid, sulfonic acid from alkylbenzene mixtures, lauryl benzene sulfonic acid, dodecylbenzene sulfonic acid.

As a source of suspending agents 18, arabic gum, tragacanth gum, locust bean gum, carrageenan gum, damar gum, xanthan gum, and gellan gum may be used.

The defoamer 20 has a silicone base.

The clays 12 employed are based on sodium bentonites, calcium polycationics, attapulgite, kaolinite, sepiolite, smectite, montmorillonite, and zeolite.

In the table below, the weight percent of compounds used in forming the adjuvant of this invention follows:

| | |
|---|---|
| Emulsifiers | 10 to 30% |
| Surfactants | 7.0 to 25% |
| Suspension Agents | 0.15 to 1.0% |
| Defoamer | 2 to 20% |
| Clays | 5.0 to 20% |
| Water | 50 to 80% |

Said adjuvant 10 displays low viscosity liquid characteristic and the manufacturing process is initiated from the addition of water 11 in a mixer 22 of suitable volume, of stainless steel, preferably with stirring control system 24 and having heating system 26. With the heating system 26 on, the suspending agent 18 is opened, with strong stirring. After opening, the product is cooled and defoamer 20, emulsifying agents 14, clays 12, and surfactants 16 are added. With each addition, a homogenization is made where the components are fully opened, so that the next component can be added. After the mixing process is finished, the product with a low viscosity liquid characteristic is obtained.

Figure 2:
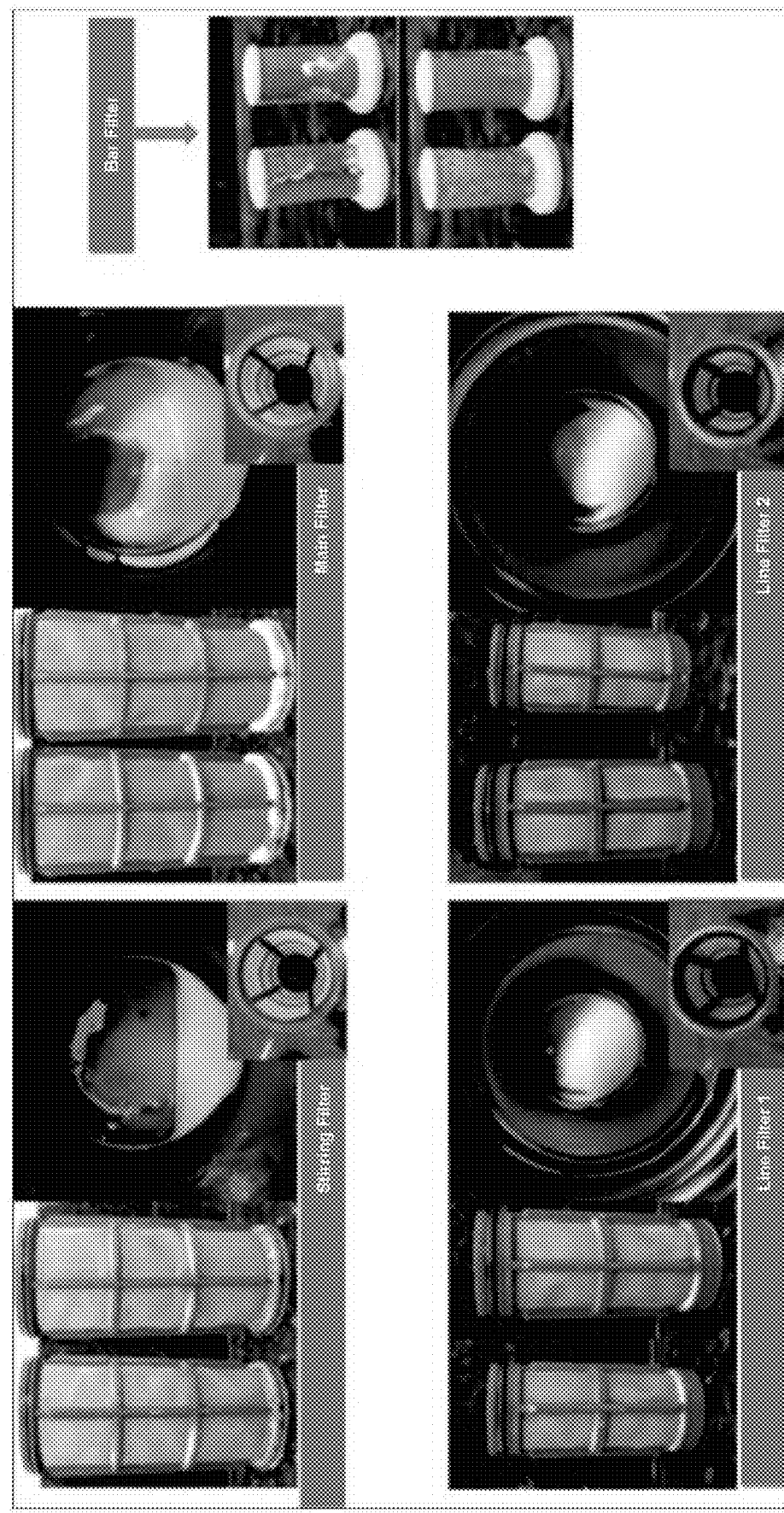
FIG. 2 shows images of filters removed from the sprayer after spraying for the visual qualitative verification of residues.

To illustrate the advantages of the low viscosity adjuvant, reference is made to FIG. 2. In FIG. 2, a standard phytosanitary syrup is applied by a 100 L capacity spray simulator without the adjuvant. The simulator contains an application system with a 50 mesh main filter, three 60 mesh line filters, and two spray tip systems with 80 and 100 mesh filters. Residues corresponding to crystallization or flocculation are detected by collecting all filters. Thus, after simulated spraying, the filters are removed and photographed for visual qualitative verification of residues, as shown in FIG. 2.

After application of the syrup, documentation, and individual cleaning of filters, they are replaced and a cleaning syrup is prepared with an appropriate product. This syrup is sprayed again and subsequently the filters are removed and photographed for visual qualitative verification of residues that may have been left in the sprayer.

The entire methodology is repeated with the insertion of the adjuvant in the same standard phytosanitary syrup. The results are compared to verify the potential for waste reduction when using this adjuvant (or any other application technology product).

In laboratory bench tests, it is also possible to evaluate the effectiveness of the invention in relation to syrup conditioning by performing the following protocol:

| PROTOCOL CODE | MIXTURE | DOSE (L/Kg)/ha | DOSE (mL/g)/L |
|---|---|---|---|
| WATER TEMPERATURE: 15° C. | | | |
| 3 | Adjuvant + Emulsifiable oil + Herbicide + Native + Foliar fertilizer + Liquid inoculant | 0.1 + 0.05 + 0.5 + 1 + 0.6 + 1 + 0.2 | 1 + 0.5 + 5 + 10 + 6 + 10 + 2 |
| 5 | Adjuvant + Emulsifiable oil + Herbicide + Native + Foliar fertilizer + Liquid inoculant | 0.1 + 0.05 + 1 + 0.6 + 0.5 + 1 + 0.2 | 1 + 0.5 + 10 + 5 + 6 + 10 + 2 |
| 7 | Herbicide + Native + Foliar fertilizer + Liquid inoculant | 1 + 0.6+ 1 + 0.2 | 10 + 6 + 10 + 2 |

The evaluation protocol demonstrating the pH and total syrup of the protocols is shown below:

| Evaluation Protocol | | | |
|---|---|---|---|
| | Mixture | pH | Total syrup |
| 3 | Adjuvant + Emulsifiable oil + Herbicide + Native + Foliar fertilizer + Liquid inoculant | 5/4.5/4.5//5/5/4/4 | 4 |
| 5 | Adjuvant + Emulsifiable oil + Herbicide + Native + Foliar fertilizer + Liquid inoculant | 5/4.5/4.5/4.5/4.5/4/4 | 4 |
| 7 | Herbicide + Native + Foliar Fertilizer + Liquid inoculant | 5.5/5.5/4/4 | 4 |

The flow rate used is 100 L/h, following this procedure: after adding the components of each protocol, stir the mixture in the Becker glass constantly for two minutes and perform the evaluation via a 100 mesh sieve. The results obtained are recorded by means of photos, before and after stirring. Once the records are finished, the mixture remains at rest for a period of two hours.

Figure 3:
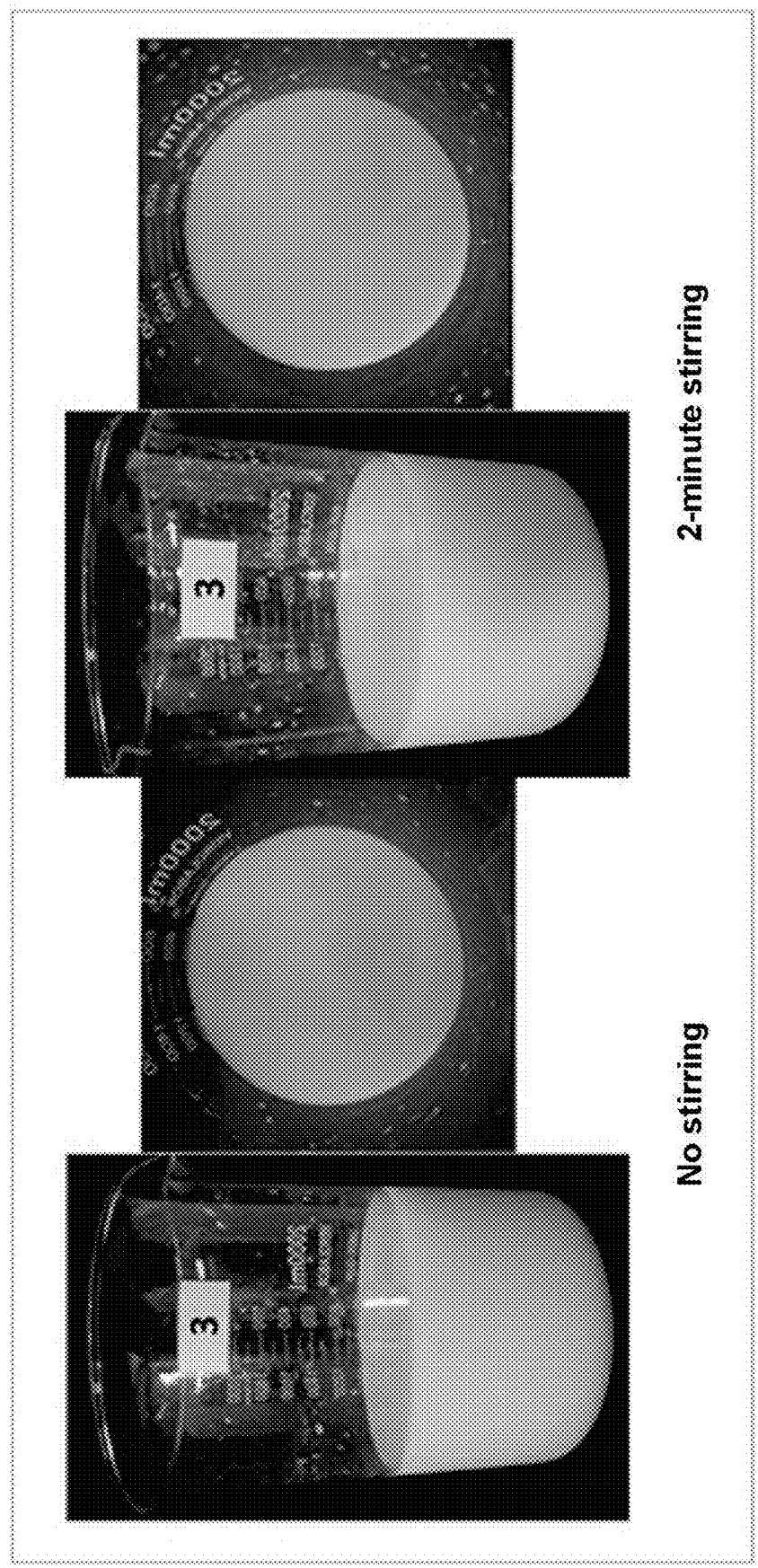
FIG. 3 shows images of protocol code 3 before and after stirring in a Becker cup.
Figure 4:
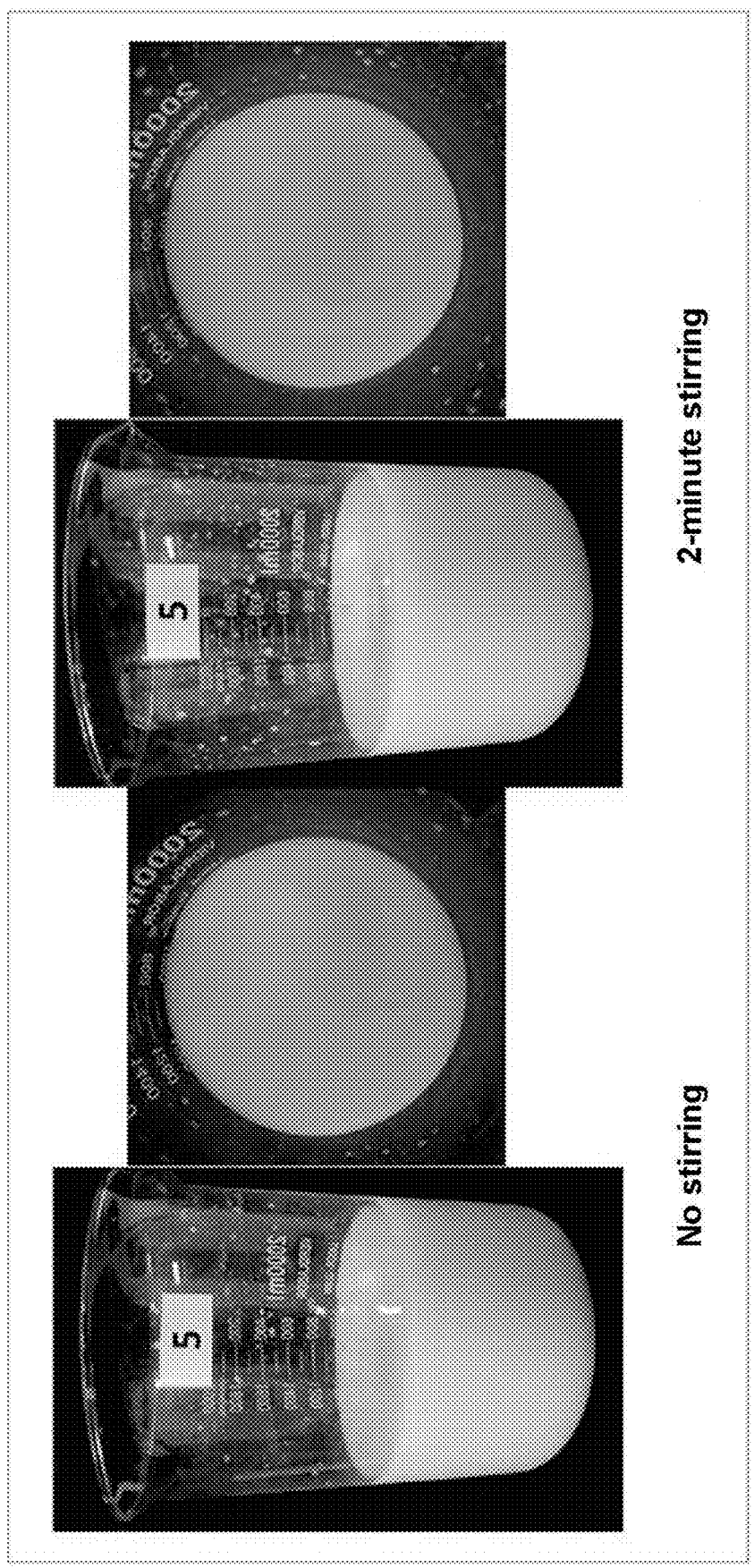
FIG. 4 shows images of protocol code 5 before and after stirring in a Becker cup.
Figure 5:
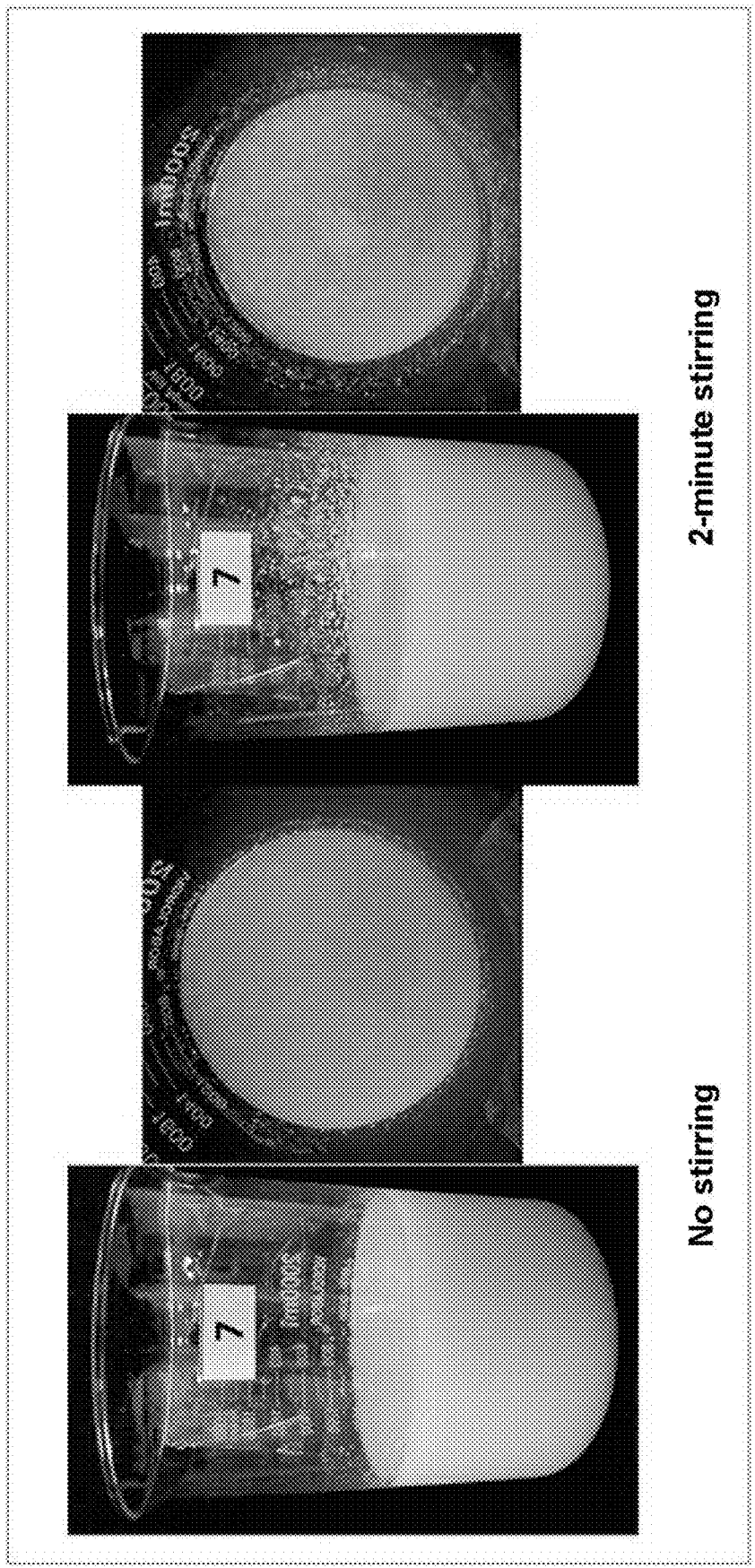
FIG. 5 shows images of protocol code 7 before and after stirring in a Becker cup.
Figure 6:
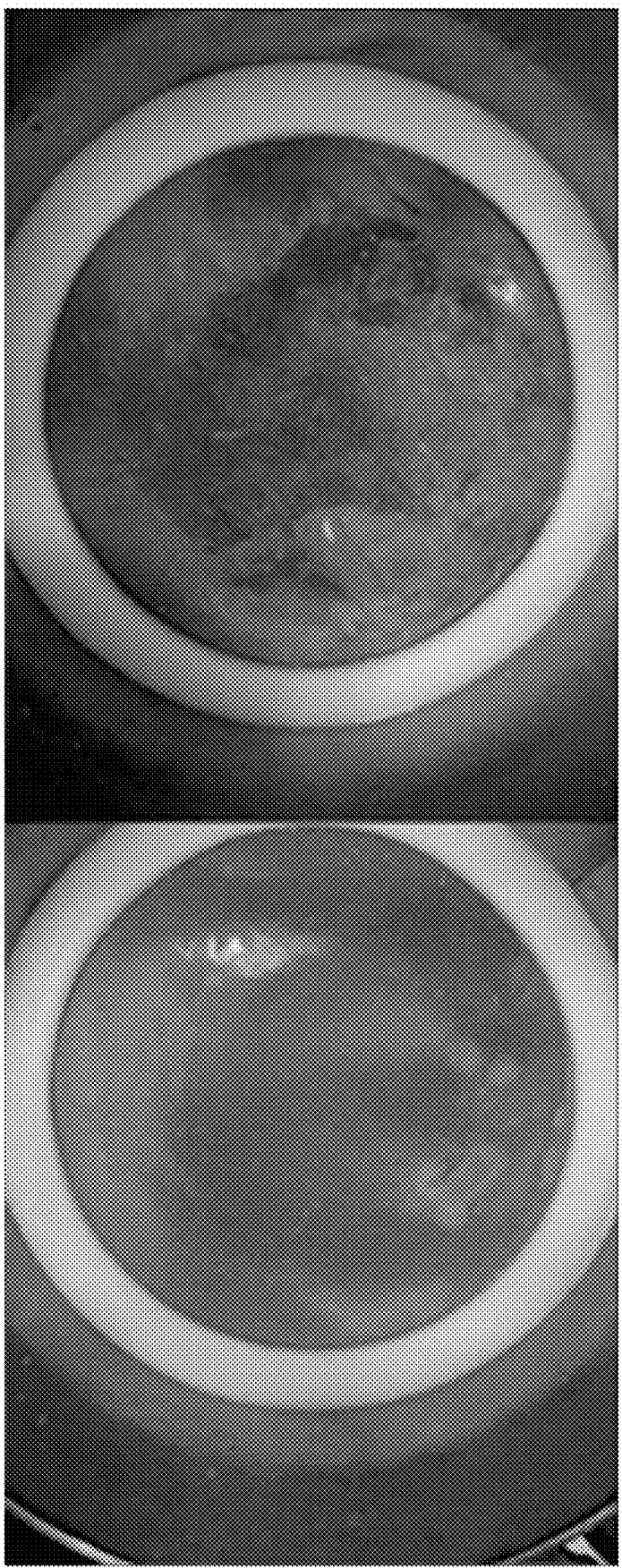
FIG. 6 depicts in the images the residue of protocol 3 retained in the sieve before the passage of running water (left image) and after the passage of running water (right image)
Figure 7:
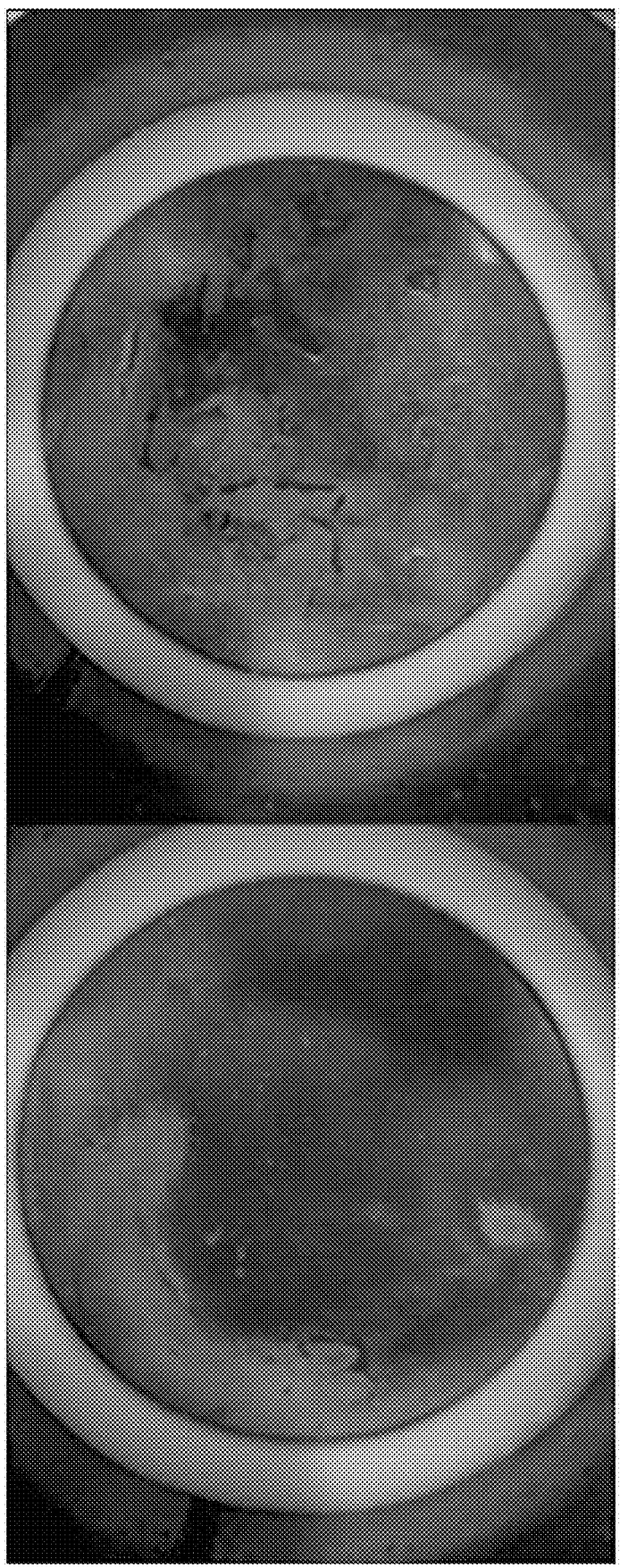
FIG. 7 represents in the images the residue of protocol 5 retained in the sieve before the passage of running water (left image) and after the passage of running water (right image)
Figure 8:
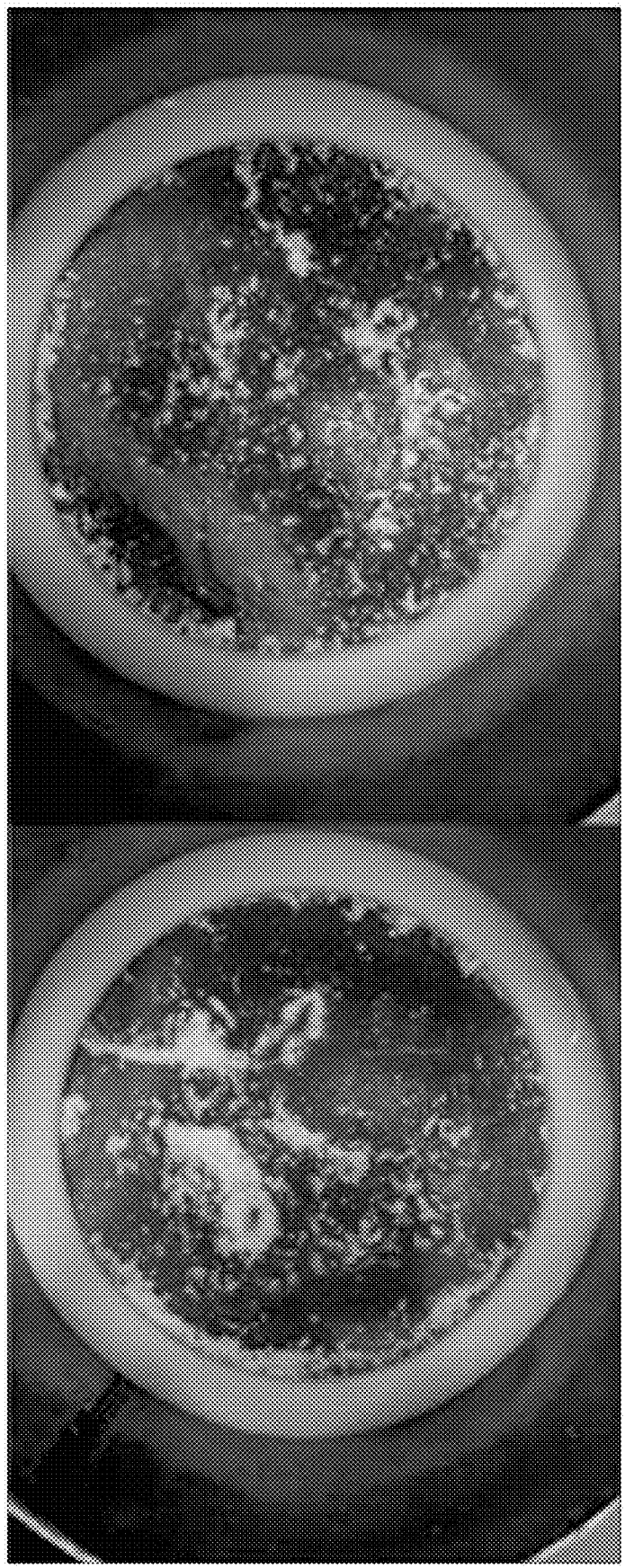
FIG. 8 shows in the images the residue of the protocol 7 retained in the sieve before the passage of running water (left image) and after the passage of running water (right image).

FIGS. 3, 4, and 5 depict the mixtures before and after stirring and FIGS. 6, 7, and 8 depict the evaluations on the sieve after the two-hour rest.

FIG. 6 shows the residue of protocol 3 (Adjuvant+Emulsifiable oil+Herbicide+Native+Foliar fertilizer+Liquid inoculant) retained in the sieve before the passage of running water (left image) and after the passage of running water (right image).

FIG. 7 depicts the residue of protocol 5 (Adjuvant+Emulsifiable oil+Herbicide+Native+Foliar fertilizer+Liquid inoculant) retained in the sieve before the passage of running water (left image) and after the passage of running water (right image).

Finally, FIG. 8 shows the residue of protocol 7 (Herbicide+Native+Foliar fertilizer+Liquid inoculant) retained in the sieve before the passage of running water (left image) and after the passage of running water (right image).

Thus, it is possible to observe that the presence of the adjuvant in the spray syrup shows no increase in viscosity and fulfills its objective of avoiding the formation of lumps, compared to mixtures without the presence of the adjuvant in question.

The invention has the function of benefiting farmers in relation to agricultural sprays regarding the efficiency of phytosanitary products in direct contact with plants and regarding the mixing of phytosanitary products in the spray syrup. With this, the farmer optimizes the application and optimizes the useful life of their equipment, that is, it can be said that said invention acts by benefiting the farmer since its addition in the mixing tank, in relation to the compatibility of the phytosanitary products, and promotes beneficial functions during and after the application, being an important item for the best effectiveness of the products used in the syrup.

The invention confers high syrup conditioning capacity and high application performance, providing a homogeneous and fluid syrup preparation, with high efficiency from the outlet of the spray nozzle to the deposition of droplets in the culture.

Their main advantages are: the improvement in the interaction between the phytosanitary products used in the syrup mixture, thus achieving better fluidity thereof; reduces problems with foaming; increases the operational efficiency of the spray, reducing the stops for cleaning tips and filters; optimizes the deposition of sprayed droplets, with greater coating of the plants; intensifies the wettability, providing greater efficiency of the phytosanitary products used in the spray syrup and; also has the function of drift reducer, encrusted reducer, spreader, and adhesive.

What is claimed is:

1. A low viscosity agricultural adjuvant for spraying syrups, comprising:
   10% to 30% by weight of emulsifying agents,
   7% to 25% by weight of surfactants,
   0.15% to 1.0% by weight of suspending agents,
   2.0% to 20% by weight of a silicone defoamer,
   5.0% to 20% by weight of clays, and
   50% to 80% by weight of water.

2. The low viscosity agricultural adjuvant for spraying syrups according to claim 1, wherein the emulsifying agents and surfactant agents are selected from a group comprising ammonium lauryl ether sulfate, sodium lauryl ether sulfate, triethanolamine lauryl ether sulfate, sodium lauryl ether sulfosuccinate, ammonium lauryl sulfate, sodium lauryl sulfate, ethoxylated alcohols, ethoxylated and propoxylated alcohols, ethoxylated fatty alcohols, ethoxylated ketostearyl alcohol, ethoxylated stearyl alcohol, ethoxylated istridecyl alcohol, ethoxylated and phosphate istridecyl alcohol, ethoxylated and sulfated istridecyl alcohol, ethoxylated lauryl alcohol, ethoxylated oil, linear alkylbenzene sulfonic acid, sulfonic acid of alkylbenzene mixtures, lauryl benzene sulfonic acid, and dodecylbenzene sulfonic acid.

3. The low viscosity agricultural adjuvant for spraying syrups according to claim 1, wherein the suspending agents are selected from a group comprising arabic gum, tragacanth gum, locust bean gum, carrageenan gum, damar gum, xanthan gum, and gellan gum.

4. The low viscosity agricultural adjuvant for spraying syrups according to claim 1, wherein the clays are selected from a group consisting of sodium bentonites, calcium polycationics, attapulgite, kaolinite, sepiolite, smectite, montmorillonite, and zeolite.

5. A method of manufacturing a low viscosity agricultural adjuvant for spraying syrups comprising the steps of:
   mixing water and a suspending agent in a mixer of stainless steel to form a mixture;
   heating said mixture during mixing;
   allowing said mixture to cool;
   adding a silicone defoamer, an emulsifying agent, a clay, and a surfactant to said mixture in said mixer and operating said mixer to form said low viscosity agricultural adjuvant, wherein said low viscosity agricultural adjuvant comprises;
   10% to 30% by weight of said emulsifying agent,
   7% to 25% by weight of said surfactant,
   0.15% to 1.0% by weight of said suspending agent,
   2.0% to 20% by weight of said silicone defoamer,
   5.0% to 20% by weight of said clay, and
   50% to 80% by weight of said water.

* * * * *